(No Model.) 2 Sheets—Sheet 1.
W. D. HAYNER & C. W. MANGUS.
CHECK ROW CORN PLANTER.
No. 323,324. Patented July 28, 1885.
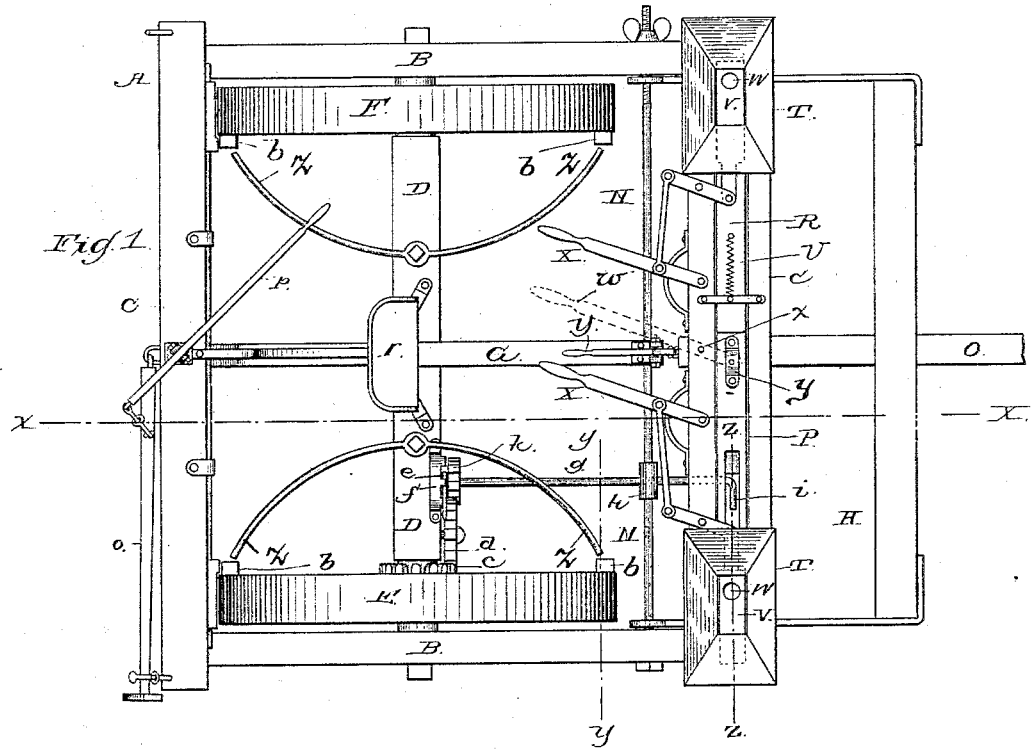
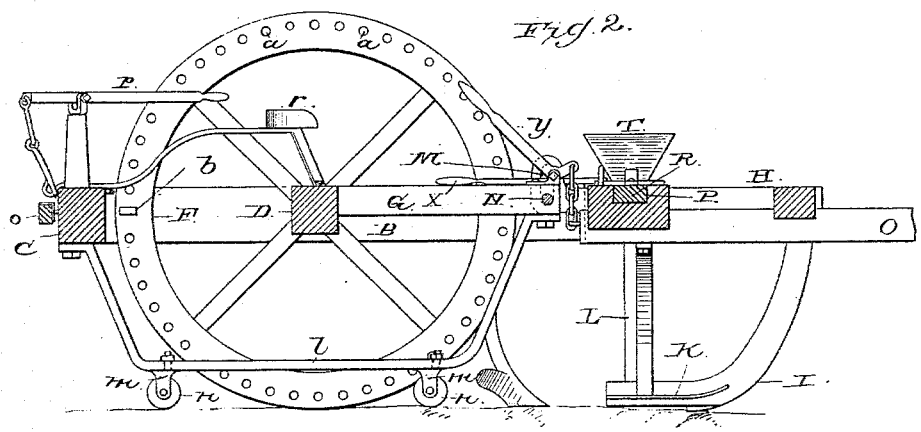
WITNESSES
W. D. Hayner
C. W. Mangus
INVENTORS,
their Attorneys.

(No Model.) 2 Sheets—Sheet 2.
W. D. HAYNER & C. W. MANGUS.
CHECK ROW CORN PLANTER.
No. 323,324. Patented July 28, 1885.
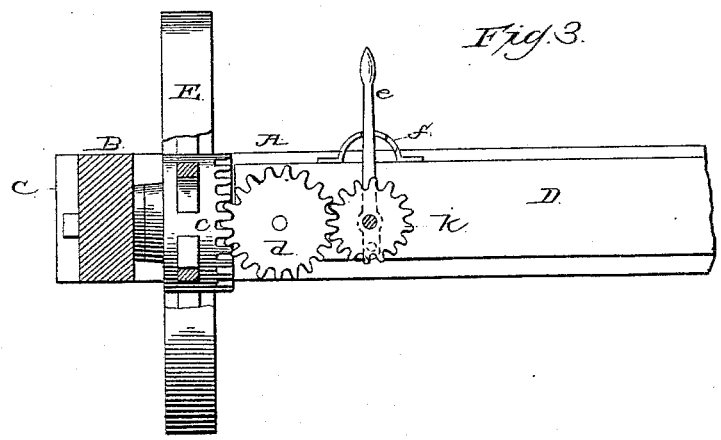
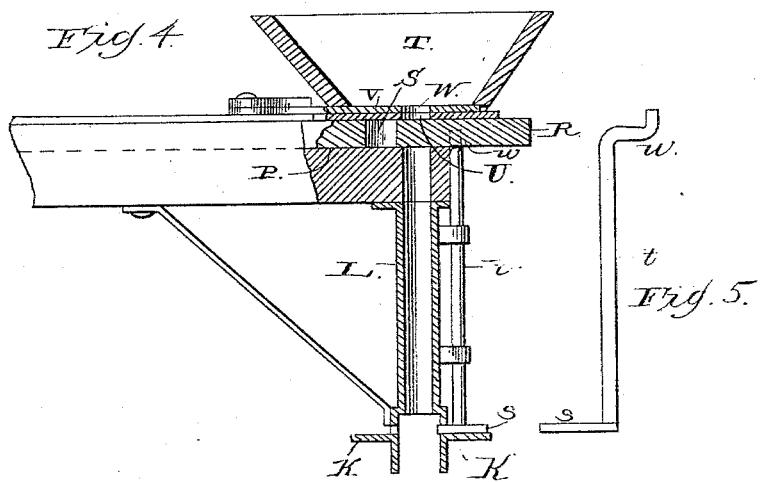

UNITED STATES PATENT OFFICE.

WILLIAM D. HAYNER AND CHARLES W. MANGUS, OF GILLIAM, MISSOURI.

CHECK-ROW CORN-PLANTER.

SPECIFICATION forming part of Letters Patent No. 323,324, dated July 28, 1885.

Application filed April 15, 1885. (No model.)

*To all whom it may concern:*

Be it known that we, WILLIAM D. HAYNER and CHARLES W. MANGUS, citizens of the United States, residing at Gilliam, in the county of Saline and State of Missouri, have invented a new and useful Improvement in Check-Row Corn-Planters, of which the following is a specification, reference being had to the accompanying drawings.

Our invention relates to an improvement in check-row corn-planters; and it consists in the peculiar construction and combination of devices that will be more fully set forth hereinafter, and particularly pointed out in the claims.

In the accompanying drawings, Figure 1 is a top plan view of a corn-planter embodying our invention. Fig. 2 is a vertical longitudinal sectional view of the same, taken on the line $x\,x$ of Fig. 1. Fig. 3 is a detailed vertical sectional view taken on the line $y\,y$ of Fig. 1. Figs. 4 and 5 are detail views.

A represents the main frame, which consists of the side beams, B, and the rear transverse connecting-beam, C. The axle D is of wood, and is preferably of about the same diameter as the beams of the frame, and is rigidly secured in the frame, as shown. The ends of the axle are reduced to form spindles, on which are mounted the wheels E F. From the center of the axle projects forwardly a beam, G.

H represents a frame, to which are secured furrow openers or runners I, having side extending wings K, for preventing the furrow-openers from running too deeply in the ground. Conveyer-tubes L connect the ends of the rear beam of the frame H to the furrow-openers. The side beams of the frame H extend rearwardly, and in the rear ends of these side beams are cut vertical slots M. A coupling-rod, N, passes through the front ends of the beams B and G and through the slots M, and hinges the frame H to the frame A. The slots M permit the frame H to move vertically independent of the main frame.

O represents the tongue that is bolted to the center of the hinged frame, in line with the beam G. A groove, P, is made in the upper side of the rear beam of the hinged frame, and in this groove works the reciprocating seed-slide R. This slide has openings S near its ends that, when the slide is at one limit of its movement, register with openings in the rear beam of the hinged frame that communicate with the upper ends of the seed-conveyers L.

T represents hoppers that are secured on the ends of the rear beam of the hinged frame, and these hoppers have openings U in their bottoms.

Slides V are placed in the bottoms of the hoppers, and have openings W, that communicate with the openings U when the slides are pushed out, and when the said slides are drawn in they cut off the openings U, and can thus permit seeds being fed from either or both of the hoppers at will. In order to move the slides, we employ hand-levers X, which are fulcrumed to the rear beam of the hinged frame and connected to the slides, as shown.

On the front end of the beam G is fulcrumed a bent lever, Y, that is connected to the rear end of the tongue by a chain, as shown. By means of this lever the hinged frame may be raised, so as to bring the furrow-openers out of contact with the ground when the machine is being drawn along and not in operation.

In the inner faces of the wheels E and F are made a series of openings, $a$, to receive the markers $b$, two of which are applied to each wheel and diametrically opposite to each other.

To the hub of the wheel E is fixed a gear-wheel, $c$, that meshes with a gear-wheel, $d$, arranged at right angles to it and journaled upon a spindle, $d$, that projects from the front side of the axle.

$e$ represents a hand-lever that is fulcrumed at its lower end to the axle, and that engages with a rack, $f$, secured to the axle, by means of which rack the lever may be secured at any desired point. One end of a shaft, $g$, is loosely journaled in the hand-lever $e$, and passes through a journal-block, $h$, that is suspended on the coupling-rod, and the front end of this shaft has a finger, $i$, that, as the shaft revolves, strikes against a depending lug on the seed-slide and operates the slide.

To the inner end of the shaft $g$ is fixed a pinion, $k$, that meshes with the gear-wheel $d$ and imparts motion to the shaft. By means of the hand-lever, to which one end of the shaft is journaled, the pinion may be caused to disengage from the gear-wheel $d$ when it is desired to cease planting the corn.

Centrally to the under side of the main frame is secured a depending bent frame, $l$, to the lower portion of which are swiveled casters $m$, having rollers $n$, that bear upon the ground and steady the motion of the main frame and keep it horizontal as the machine is being drawn along.

A marker, $o$, is pivoted centrally to the rear side of the main frame, and a lever, $p$, is provided and attached to the marker, by means of which lever the driver, seated in the seat $r$, secured to the main frame, can throw or swing the marker to either side of the machine.

In order to cause the corn that is fed into the conveyer-tubes by the seed-slide to fall into the ground in a lump and avoid scattering the seeds, we close the lower ends of the conveyer-tubes by pivoted slides $s$, controlled by vertical rods $t$ that are journaled alongside the tubes and have cranks $u$ at their upper ends. These cranks are connected with the seed-slide, and as the slide moves back and forth the pivoted slides alternately open and close the lower ends of the tubes and drop the seeds that have been deposited upon them by the seed-slide into the ground together, as will be very readily understood. The finger $i$ on the shaft $g$ moves the feed-slide in one direction, and the slide is retracted by a coiled spring, $v$.

The operation of our invention is as follows: The markers in the wheels are arranged so as to make a depression in the side of the hills as the machine is being drawn along, and the machine plants two hills at a time, which are exactly in line with each other. When the end of the rows is reached, the planting mechanism is thrown out of gear, and the machine turned around and placed with the seed-tubes exactly in line with the last hills of the rows just planted. A hand-lever, $w$, is then fulcrumed on a stud, $x$, on the rear beam of the hinged frame, and the power end of the lever inserted into a bail, $y$, secured on the seed-slide, and the seed-slide is then worked by hand and caused to plant the first two hills. The instant the first two hills are planted the hand-lever is removed and the planting mechanism thrown in gear. Pointers $z$ are secured to the axles, and these pointers will indicate the openings in the inner sides of the wheels that will align with the hills planted. If the markers applied to the wheels are not in these openings they must be placed in them, and then the operation of planting will proceed as before.

Having thus described our invention, we claim—

1. The combination of the main frame, the driving and supporting wheels, gear-wheels $c$ and $d$, fulcrumed lever $e$, shaft $g$, having one end journaled in lever $e$, and a finger, $i$, at the opposite end, pinion $k$, fixed to shaft $g$ and meshing with gear $d$, and the frame H, hinged to the main frame and carrying the seed-tubes, furrow-openers, seed-hoppers and seed-slide, the latter operated by the finger $i$, substantially as described.

2. In a check-row corn-planter, the driving and supporting wheels having the openings in their rims, markers $b$ adapted to be inserted in the openings, and the pointers $z$ for indicating the openings that will align with the hills, substantially as described.

3. The combination of the main frame having the supporting-wheels, the frame H, hinged thereto, and having the furrow-openers, hoppers, and seed-slide, and the frame $l$, depending from and secured to the main frame and having the rollers $n$ for maintaining the main frame in a horizontal position, substantially as described.

In testimony that we claim the foregoing as our own we have hereto affixed our signatures in presence of two witnesses.

WILLIAM D. HAYNER.
CHARLES W. MANGUS.

Witnesses:
   JNO. W. MCKINNEY,
   JAMES M. POWELL.